United States Patent
Indurkar (10) Patent No.: US 11,190,985 B1
(45) Date of Patent: Nov. 30, 2021

(54) INTERNET OF THINGS (IOT) DEVICES WIRELESS COMMUNICATION SERVICE MANAGEMENT PLATFORM

(71) Applicant: T-MOBILE INNOVATIONS LLC, Overland Park, KS (US)

(72) Inventor: Dhananjay Indurkar, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/886,521

(22) Filed: May 28, 2020

(51) Int. Cl.
| | |
|---|---|
| H04W 28/24 | (2009.01) |
| H04W 8/10 | (2009.01) |
| H04W 8/18 | (2009.01) |
| H04L 12/801 | (2013.01) |
| H04L 12/927 | (2013.01) |
| H04W 28/02 | (2009.01) |
| H04W 8/20 | (2009.01) |

(52) U.S. Cl.
CPC .......... *H04W 28/24* (2013.01); *H04L 47/14* (2013.01); *H04L 47/805* (2013.01); *H04W 8/183* (2013.01); *H04W 8/205* (2013.01); *H04W 28/0268* (2013.01)

(58) Field of Classification Search
CPC . H04W 28/0268; H04W 28/24; H04W 8/183; H04W 8/205; H04L 47/14; H04L 47/805
See application file for complete search history.

(56) References Cited

U.S. PATENT DOCUMENTS

| | | | |
|---|---|---|---|
| 10,833,929 | B2 | 11/2020 | Watsen et al. |
| 10,880,711 | B1 | 12/2020 | Holmes |
| 10,887,741 | B1 | 1/2021 | Indurkar |
| 11,102,646 | B1 | 8/2021 | Indurkar |
| 11,115,810 | B1 | 9/2021 | Indurkar |
| 2011/0246374 | A1 | 10/2011 | Franz |
| 2015/0334552 | A1 | 11/2015 | Li et al. |
| 2016/0092145 | A1 | 3/2016 | Manning et al. |
| 2016/0246611 | A1 | 8/2016 | Li et al. |

(Continued)

OTHER PUBLICATIONS

Notice of Allowance dated Sep. 4, 2020, U.S. Appl. No. 16/821,950, filed Feb. 17, 2020.

(Continued)

*Primary Examiner* — Yuwen Pan
*Assistant Examiner* — Hung K Du (57) ABSTRACT

An Internet of things (IoT) devices wireless communication service enablement platform. The platform comprises a memory, a processor, and an IoT devices wireless communication service enablement application stored in the memory. When executed by the processor, the application receives a rule set for enabling wireless communication service for a plurality of IoT devices, where the rule set associates service codes to quality of service (QoS) levels to be provided to the IoT devices, receives a message comprising a service code from the one of the IoT devices, identifies a QoS level in the rule set that matches the received service code, monitors the location of the one of the IoT devices, builds an eSIM profile based on the location of the one of the IoT devices and based on the QoS level that matches the received service code, and sends the eSIM profile to the one of the IoT devices.

17 Claims, 4 Drawing Sheets

(56) References Cited

U.S. PATENT DOCUMENTS

| | | | |
|---|---|---|---|
| 2016/0255567 A1 | 9/2016 | Petersson et al. | |
| 2018/0014184 A1 | 1/2018 | Schell et al. | |
| 2019/0132204 A1 | 5/2019 | McGrath et al. | |
| 2019/0140837 A1 | 5/2019 | Cheng et al. | |
| 2020/0120494 A1 | 4/2020 | Fares et al. | |
| 2020/0178070 A1 | 6/2020 | Yang et al. | |
| 2020/0221294 A1 | 7/2020 | Kang et al. | |
| 2020/0228488 A1 | 7/2020 | Xu et al. | |
| 2020/0236529 A1* | 7/2020 | Anslot | H04W 60/00 |
| 2020/0260241 A1 | 8/2020 | Sicard | |
| 2020/0322846 A1 | 10/2020 | Hampali et al. | |
| 2020/0322884 A1* | 10/2020 | Di Girolamo | H04W 4/70 |
| 2020/0351651 A1 | 11/2020 | Koo et al. | |
| 2020/0351761 A1 | 11/2020 | Horna | |
| 2020/0389783 A1 | 12/2020 | Kang et al. | |
| 2020/0404501 A1 | 12/2020 | Kang et al. | |
| 2021/0029761 A1* | 1/2021 | Jung | H04W 4/40 |
| 2021/0076195 A1 | 3/2021 | Chaugule et al. | |
| 2021/0112401 A1 | 4/2021 | Chadwick et al. | |
| 2021/0120387 A1 | 4/2021 | Roy et al. | |
| 2021/0120424 A1 | 4/2021 | Kang et al. | |

OTHER PUBLICATIONS

Indurkar, Dhananjay, "Activation Communication Addresses of Internet of Things Devices," filed Nov. 24, 2020, U.S. Appl. No. 17/102,627.

First Action Interview Pilot Program Pre-Interview Communication dated Jan. 29, 2021, U.S. Appl. No. 16/821,943, filed Feb. 19, 2021.

Indurkar, Dhananjay, et al., "Embedded Subscriber Identity Module (eSIM) Profile Adaptation Based on Context," filed May 21, 2020, U.S. Appl. No. 16/880,723.

Indurkar, Dhananjay, et al., "Bootstrap Electronic Subscriber Identity Module Configuration," filed Mar. 17, 2020, U.S. Appl. No. 16/821,937.

Indurkar, Dhananjay, et al., "Triggering Electronic Subscriber Identity Module Activation", filed Mar. 17, 2020, U.S. Appl. No. 16/821,943.

Indurkar, Dhananjay, et al., "Activation Communication Addresses of Internet of Things Devices", filed Mar. 17, 2020, U.S. Appl. No. 16/821,950.

Notice of Allowance dated Jun. 14, 2021, U.S. Appl. No. 16/880,723, filed May 21, 2020.

Notice of Allowace dated May 19, 2021, U.S. Appl. No. 16/821,937, filed Mar. 17, 2020.

Indurkar, Dhananjay, et al., "Electronic Subscriber Identity Module (eSIM) Profile Delivery and Activation System and Methods" filed Sep. 16, 2020, U.S. Appl. No. 17/023,347.

Indurkar, Dhananjay, et al., "Electronic Subscriber Identity Module (eSIM) Profile Provisioning" filed Sep. 16, 2020, U.S. Appl. No. 17/023,352.

Indurkar, Dhananjay, et al., "Embedded Subscriber Identity Module (eSIM) Profile Adaptation Based on Context," filed May 18, 2021, International Application No. PCT/US21/33041.

Indurkar, Dhananjay, et al., "Internet of Things (IoT) Devices Wireless Communication Service Management Platform" filed May 24, 2021, International Application No. PCT/US21/33922.

FAIPP Pre-Interview Communication dated Apr. 15, 2021, U.S. Appl. No. 16/880,723, filed May 21, 2020.

FAIPP Pre-Interview Communication dated Mar. 26, 2021, U.S. Appl. No. 16/821,937, filed Mar. 17, 2020.

Notice of Allowance dated Apr. 29, 2021, U.S. Appl. No. 16/821,943, filed Feb. 19, 2021.

Indurkar, Dhananjay, "Embedded Subscriber Identity Module (eSIM) Profile Adaptation Based on Context," filed Aug. 27, 2021, U.S. Appl. No. 17/459,763.

Indurkar, Dhananjay, "Bootstrap Electronic Subscriber Identity Module Configuration," filed Aug. 20, 2021, U.S. Appl. No. 17/408,366.

* cited by examiner

INTERNET OF THINGS (IOT) DEVICES WIRELESS COMMUNICATION SERVICE MANAGEMENT PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may complete an authentication process with a cell site to obtain a wireless communication link from the cell site and access to the radio access network that the cell site is a part of. This may involve the wireless communication device radio transceiver obtaining network access keys or network access credentials from a subscriber identity module (SIM) and providing those network access keys or network access credentials to the cell site. The SIM may be a smart card that comprises memory and a processor. SIM cards may be removable in some circumstances, for example in traditional mobile phones. By removing a first SIM card and installing a second SIM card in a mobile phone, a user may change his or her service provider network. Removable SIM cards may not be provided in some wireless communication devices, where the role of the SIM card is instead performed by an embedded universal integrated circuit card (eUICC) that may be provisioned with network access keys and/or network access credentials, one or more access point names (APNs), a preferred roaming list (PRL), branding information, applications, and other data artifacts. The radio transceiver may then obtain the network access keys or network access credentials from the eUICC and provide those network access keys or network access credentials to the cell site to obtain a wireless communication link.

SUMMARY

In an embodiment, an Internet of things (IoT) devices wireless communication service enablement platform is disclosed. The IoT devices wireless communication service enablement platform comprises a non-transitory memory, a processor, and an IoT devices wireless communication service enablement application stored in the non-transitory memory. When executed by the processor, the IoT devices wireless communication service enablement application receives a rule set for enabling wireless communication service for a plurality of IoT devices, where the rule set associates a plurality of service codes to a matching plurality of wireless communication quality of service (QoS) levels to be provided to the IoT devices, receives a message from one of the IoT devices, where the message comprises information about a communication context of the IoT device, and receives a message from the one of the IoT devices, where the message comprises one of the service codes. The IoT devices wireless communication service enablement application further identifies a QoS level in the rule set that matches the service code received from the one of the IoT devices, determines an eSIM profile based on analyzing the information about the communication context of the IoT device and based on the QoS level that matches the service code received from the one of the IoT devices, and sends a command to activate the eSIM profile to the one of the IoT devices, whereby the one of the IoT devices is enabled to receive wireless communication service according to the QoS level that matches the service code sent by the one of the IoT devices.

In another embodiment, a method of enabling wireless communication service delivery to Internet of things (IoT) devices is disclosed. The method comprises receiving a rule set for enabling wireless communication service for a plurality of IoT devices by an IoT devices wireless communication service enablement application executing on a computer system, where the rule set associates a plurality of service codes to a matching plurality of wireless communication quality of service (QoS) levels to be provided to the IoT devices and receiving a message by the IoT devices wireless communication service enablement application from one of the IoT devices, where the message comprises one of the service codes. The method further comprises identifying by the IoT devices wireless communication service enablement application a QoS level in the rule set that matches the service code received from the one of the IoT devices, determining an eSIM profile by the IoT devices wireless communication service enablement application based on analyzing the information about the communication context of the IoT device and based on the QoS level that matches the service code received from the one of the IoT devices, and sending a command to activate the eSIM profile by the IoT devices wireless communication service enablement application to the one of the IoT devices, whereby the one of the IoT devices is enabled to receive communication service according to the QoS level that matches the service code sent by the one of the IoT devices.

In yet another embodiment, an Internet of things (IoT) devices wireless communication service enablement platform is disclosed. The IoT devices wireless communication service enablement platform comprises a non-transitory memory, a processor, and an IoT devices wireless communication service enablement application stored in the non-transitory memory. When executed by the processor, the IoT devices wireless communication service enablement application receives a rule set for enabling wireless communication service for a plurality of IoT devices, where the rule set associates a plurality of service codes to a matching plurality of wireless communication quality of service (QoS) levels to be provided to the IoT devices, receives a message from the one of the IoT devices, where the message comprises one of the service codes, and identifies a QoS level in the rule set that matches the service code received from the one of the IoT devices. The IoT devices wireless communication service enablement application further monitors the location of the one of the IoT devices, builds an eSIM profile based on the location of the one of the IoT devices and based on the QoS level that matches the service code received from the one of the IoT devices, and sends the eSIM profile to the one of the IoT devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Internet of things (IoT) devices are expected to find widespread application in many different industries and ultimately may count tens of billions of devices. An IoT device may be a wireless communication module that can be installed into another system or mounted to another system. In some cases, the IoT device may communicate with the system it is installed in, for example to send commands to the system and/or to collect data from the system and send the collected data to a data store or terminal via the wireless network. In other cases, however, the IoT device may not communicate with the system but simply track and report a location of the system it is attached to, for example a shipping container. It is thought that some corporations may desire to reap the benefits of IoT devices without taking on the burden of managing the complexities of the wireless communication services of those IoT devices as the communication needs (e.g., quality of service (QoS level)) of these IoT devices change and as the IoT devices transition out of a wireless communication service area of a first mobile network operator (MNO) and into the wireless communication service area of a second MNO.

The present disclosure teaches an Internet of things (IoT) devices wireless communication service management platform that is used to manage wireless communication service of IoT devices on behalf of an owner of the IoT devices. The platform may also be referred to as an IoT devices wireless communication service enabler platform. The owner of the IoT devices engages the service enabler to provide wireless communication service to the owner's IoT devices. The service enabler uses the IoT devices wireless communication service enabler platform to manage and provide appropriate wireless communication service coverage for the IoT devices as their context changes. This may involve the IoT devices moving across national boundaries and coming into and out of the service areas of different mobile network operators.

The service enabler platform can migrate profiles (e.g., eSIM profiles) of the IoT devices transparently to the owner of the IoT devices. The service enabler platform automatically monitors the context of the IoT devices and commands them to activate a different eSIM profile as needed. This may involve commanding an IoT device to use a different international mobile subscriber identity (IMSI: a kind of phone number) in some cases. The IoT devices may transmit context data updates to the IoT devices wireless communication service enabler platform for use in deciding what eSIM profile to activate on the IoT devices. The service enabler platform may proactively uninstall a first plurality of eSIM profiles from an IoT device and install a second plurality of eSIM profiles into the IoT device prospectively, conjecturing that the IoT device will soon desirably be commanded to activate one of this second plurality of eSIM profiles.

Because IMSIs are limited and anchored to a specific MNO, it may be desirable that the service enabler establish wireless communication subscriptions with MNOs in a plurality of different regions, where each subscription is associated with a unique IMSI. As different IoT devices enter and leave the service area of an MNO, the service enabler platform may build a first eSIM profile having a first IMSI, provide the first eSIM profile to a first IoT device entering the service area of the first MNO, and make the first eSIM profile active on the first IoT device, thereby enabling the first IoT device to communicate at least in part based on the first IMSI in the service area of the first MNO. As the first IoT device leaves the service area, the service enabler platform may build a second eSIM profile having a second IMSI associated with a second MNO, provide the second eSIM profile to the first IoT device entering the service area of the second MNO, and make the second eSIM profile active on the first IoT device, thereby enabling the first IoT device to communicate at least in part based on the second IMSI in the service area of the second MNO. The service enabler platform may build a third eSIM profile having the first IMSI (e.g., reusing the first IMSI), provide the third eSIM profile to a second IoT device entering the service area of the first MNO, and make the third eSIM profile active on the second device, thereby enabling the second IoT device to communicate at least in part based on the first IMSI in the service area of the first MNO. In this way the service enabler can maintain a pool of subscriptions in a plurality of different MNO service areas and share the wireless communication coverage among a plurality of IoT devices that may belong to a plurality of different owners. This can create efficiencies for the IoT owners who might otherwise be obliged to maintain an excess pool of subscriptions.

In an embodiment, IoT device owners may use an interface provided by the service enabler platform to define rule sets for providing appropriate communication services to the IoT devices. Each different IoT device owner may define its own rule set or even a plurality of different rule sets. When registering IoT devices with the service enabler platform, the IoT device owner indicates what rule set pertains to each of the IoT devices. The service enabler platform then enables wireless communication service for the IoT devices in accordance with the rules.

A rule in a rule set may define a correspondence between a service code and a quality of service (QoS) level. The IoT device may communicate with the service enabler platform and send a service code based on a current desired communication function. The service enabler platform may then look up the QoS level that matches to the specified service code in the rule set to which the subject IoT device is associated. The service enabler platform may then determine what eSIM profile would provide the designated QoS level to the IoT device, build the eSIM profile, send the eSIM profile to the IoT device, and command the IoT device to activate the eSIM profile. Alternatively, if the IoT device is already provisioned with the subject eSIM profile, the IoT devices wireless communication service enabler may not send the eSIM profile but simply command the IoT device to make the subject eSIM profile active.

The IoT devices may collect data on their communication environment or communication context and transmit that data to the service enabler platform. The communication context data may include a location of the IoT device. The communication context data may include identities of MNO coverages detected. The communication context data may include signal strength of MNO coverages detected. The communication context data may include weather information, for example precipitation information. The service enabler platform may determine the content of eSIM profiles that it builds in part based on the QoS level requested by the IoT devices as well as in part based on the reports of the communication contexts of the IoT devices.

The IoT devices wireless communication service management platform may be used by a third party to provide a service offering to IoT devices owners, such as an enterprise that uses IoT devices in conducting its business. The IoT devices wireless communication service management platform may be used by a mobile network operator to manage IoT wireless communication connectivity on behalf of its subscriber customers. The IoT devices wireless communication service management platform may be used by an owner of IoT devices, for example an enterprise, to manage the wireless communication connectivity of its own IoT devices. Hence, the service enabler spoken of above may be an employee, a contractor, or team associated with a third party services company, a MNO, or an enterprise.

Figure 1:
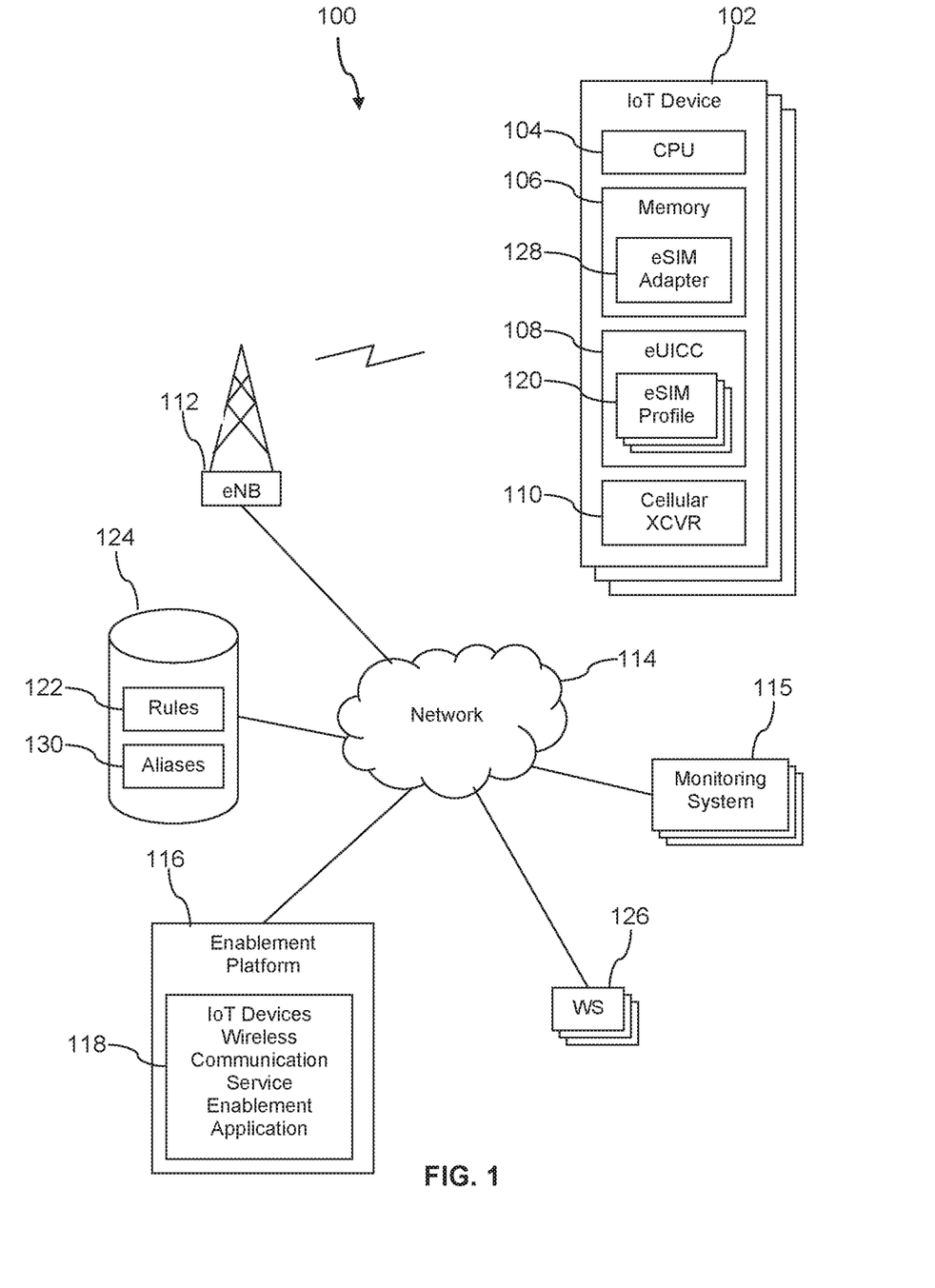
- FIG. 1 is a block diagram of a communication system according to an embodiment of the disclosure.

Turning now to FIG. 1, a communication system 100 is described. In an embodiment, the system 100 comprises an Internet of things (IoT) device wireless communication module (henceforth an IoT device) 102 that comprises a processor 104, a memory 106, an embedded universal integrated circuit card (eUICC) 108, and a cellular radio transceiver 110. The IoT device 102 may establish a wireless communication link with a cell site 112 according to a 5G, a long term evolution (LTE), a code division multiple access (CDMA), or a global system for mobile communications (GSM) telecommunication protocol. The cell site 112 may communicatively link the IoT device 102 to a network 114 and via the network 114 to a monitoring system 115. The system 100 may comprise any number of IoT devices 102, any number of cell sites 112, and any number of monitoring systems 115. The network 114 comprises one or more private networks, one or more public networks, or a combination thereof.

The IoT device 102 may be associated with another object such as an appliance, a container, a vehicle, a parcel, or other object. The IoT device 102 may interact with the object to which it is associated in various ways. It can provide commands or configuration data to the object, for example commands or configuration data sent to the IoT device 102 by a monitoring system 115 to which the IoT device 102 is associated. The monitoring systems 115 may be implemented as a computer. Computer systems are described further hereinafter.

The IoT device 102 can provide reporting data from the object to which it is associated back to the monitoring system 115 to which it is associated. This may permit an owner of the IoT devices 102 and of the objects to which the IoT devices 102 are associated to monitor and/or control the objects. It is understood that the IoT devices 102 may be owned by a variety of different and possibly unaffiliated owners and/or businesses. Each owner of IoT devices 102 may operate their own independent monitoring system 115 whereby to monitor and control their own IoT devices 102 and the objects to which they are associated. The monitoring and controlling of the IoT devices 102 and/or the objects to which they are associated may be thought of as an application layer functionality that is carried out on top of or by virtue of the communication layers under that application layer functionality.

The system 100 further comprises an IoT devices wireless communication service enablement platform (henceforth service enablement platform) 116 communicatively coupled to the network 114 that executes an IoT devices wireless communication service enablement application (henceforth service enablement application) 118. The service enablement platform 116 may be implemented by a computer. Computer systems are described further hereinafter. The service enablement application 118 interworks with the IoT devices 102 to enable the IoT devices 102 to obtain wireless communication service from the cell sites 112. In some cases, the service enablement application 118 may accomplish this, for example, by commanding one of the IoT devices 102 to activate an eSIM profile 120 that is already stored in the eUICC 108 of the subject IoT device 102, where the eSIM profile 120 is selected based on a current communication context of the IoT device 102. In some cases, the service enablement application may enable the IoT device 102 to obtain wireless communication service from the cell sites 112 by building an eSIM profile 120, sending the eSIM profile 120 to the IoT device 102, and commanding the IoT device 102 to store and to make the subject eSIM profile 120 active in its eUICC 108.

The system 100 may further comprise a plurality of workstations 126. The workstations 126 may be desktop computers, laptop computers, notebook computers, tablet computers, a combination of these different kinds of computers, or another kind of computer. The workstations 126 are able to communicate via the network 114 to the service enablement application 118 and to present a user interface provided by the service enablement application 118 to a human user of the workstation 126. The workstations 126 are able through this user interface to register IoT devices 102 with the service enablement platform 116 and to define wireless communication service enablement rules. These rules identify the wireless communication service that the owner of the IoT devices 102 want their IoT devices 102 to receive from the cell sites 112.

As the IoT device 102 and the object to which it is associated move about, the mobile network operators (MNOs) who own the cell sites 112 providing wireless communication service coverage to the IoT device 102 may change. Said in other words, as the IoT device 102 and the object to which it is associated move about, the IoT device 102 may leave the service area of a first MNO and enter the service area of a second and different MNO. In this case, to receive service from the second MNO, the IoT device 102 may need to activate a different eSIM profile 120 stored in its eUICC 108 and/or download a different eSIM profile 120, store it in the eUICC 108, and make that downloaded eSIM profile 120 active. The service enablement application 118 may monitor the location of the IoT devices 102, determine when an IoT device 102 is leaving a coverage area of a first MNO and entering the coverage area of a second MNO, and command the IoT device 102 to deactivate an eSIM profile 120 associated with the first MNO and activate an eSIM profile 120 associated with the second MNO.

In some circumstances, the eUICC 108 of the subject IoT device 102 may store a plurality of eSIM profiles 120, and the service enablement application 118 only commands the IoT device 102 to swap the active eSIM profile 120. In other circumstances, the eUICC 108 of the subject IoT device 102 does not store an eSIM profile 120 suitable for obtaining wireless communication service in the coverage area of the second MNO. In this case the service enablement application 118 may build an eSIM profile 120 suitable for obtaining service in the coverage area of the second MNO, send the eSIM profile 120 it built to the IoT device 102, command the IoT device 102 to store the eSIM profile 120 it built in the eUICC 108 of the IoT device 102, and make the eSIM profile 120 it build active in the eUICC 108.

An eSIM profile 120 comprises one or more of radio access network access credentials, a phone number or an international mobile subscriber identity (IMSI), a preferred roaming list (PRL), one or more access point names (APNs), branding information, executable applications, and other data artifacts. An eSIM profile adapter application 128 of the IoT device 102 may moderate the downloading of eSIM profiles 120 into the eUICC 108 and deleting disused eSIM profiles 120 out of the eUICC 108. The ESIM profile adapter application 128 (eSIM adapter 128 to be concise) may provide data from the active eSIM profile 120 to the cellular radio transceiver 110 on request, for example when the cellular radio transceiver 110 and/or a radio modem of the cellular radio transceiver 110 reboots or powers on. The cellular radio transceiver 110 may use the phone number/IMSI, the network access credentials, the APNs, and the PRL to obtain a wireless communication link with the cell sites 112.

Figure 2:
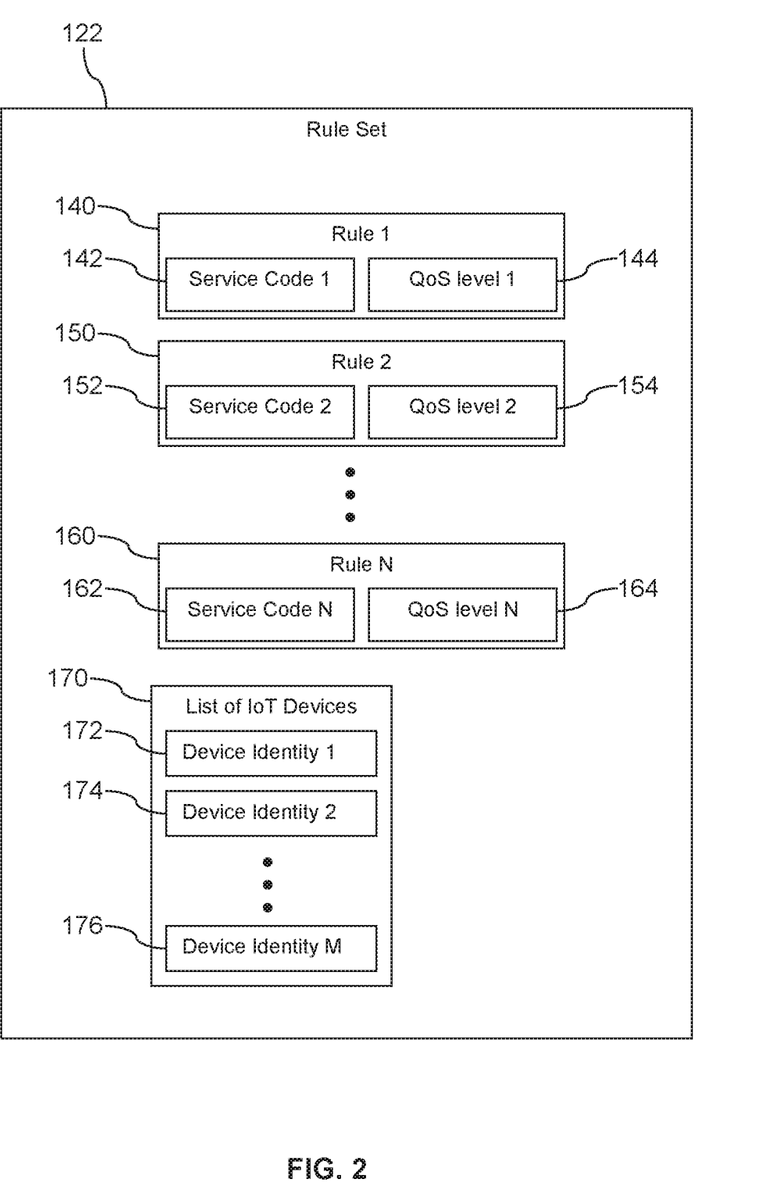
FIG. 2 is an illustration of a rule set according to an embodiment of the disclosure.

Turning now to FIG. 2, an example rule set 122 is described. In an embodiment, the rule set 122 comprises a plurality of rules that define for the service enablement application 118 the wireless communication service desired by the owner of one or more IoT devices 102. The rule set 122 may be associated with a defined set of IoT devices 102, for example a list 170 of identities of IoT devices 102. The list 170 may comprise a first IoT device identity 172, a second IoT device identity 174, and a third IoT device identity 176. It is understood that the list 170 may comprise any number of identities of IoT devices 102. The identity of IoT devices may be specified by a mobile equipment identity (MEID), by an electronic serial number (ESN), by an embedded universal integrated circuit card identity (EID), or by another identity. The rules may be defined in any way. The rules may define a communication profile or communication policy to be provided for all the IoT devices 102 associated with the subject rule set 122.

In an embodiment, the rules comprise associations of service codes to quality of service (QoS) levels. For example, a first rule 140 associates a first service code 142 to a first QoS level 144, a second rule 150 associations a second service code 152 to a second QoS level 154, and a third rule 160 associates a third service code 162 to a third QoS level 164. It is understood that the rule set 122 may comprise any number of different rules. QoS levels may define a minimum data throughput rate supported by the QoS level. QoS levels may define a priority of access supported by the QoS level. QoS levels may define a reliability supported by the QoS level. QoS levels may define a maximum jitter supported by the QoS level. QoS levels may define a maximum latency supported by the QoS level. QoS levels may define network services supported by the QoS level. QoS levels may define an asymmetrical data throughput service such as high uplink data flow rate and low downlink data flow rate or low uplink data flow rate and high downlink data flow rate.

With reference now to both FIG. 1 and FIG. 2, the IoT device 102, for example the ESIM profile adapter application 128 or another application executing on the IoT device 102, may collect and monitor a communication environment of the IoT device 102. Information about the communication environment may comprise a location of the IoT device, identities of cell sites 112 that the cellular radio transceiver 110 detects, signal strengths of the detected cell sites, weather conditions such as precipitation. The IoT device 102 may send the information about the communication environment of the IoT device 102 to the service enablement application 118. The service enablement application 118 can use the information about the communication environment of the IoT device 102 to determine what eSIM profile 120 the IoT device 102 ought to make active. For example, the location of the IoT device 102 may be used by the service enablement application 118 to determine that the IoT device 102 is leaving the service area of a first MNO and is entering the service area of a second MNO, and hence the service enablement application 118 may send a new eSIM profile 120 to the IoT device 102 to store in its eUICC 108 and to activate, whereby the IoT device 102 is enabled to obtain wireless communication service in the service area of the second MNO.

The IoT device 102, for example the ESIM profile adapter application 128 or another application executing on the IoT device 102, may monitor its own location and determine a service code that corresponds to its current wireless communication service needs. For example, an IoT device 102 coupled to a container on a container ship in the middle of the Atlantic Ocean may not desire to communicate often or at a high data throughput rate with a monitoring station 115 associated with the IoT device 102. This same IoT device 102, when the container ship is 15 miles from the destination port of the container, may desire to communicate with high priority at a high data throughput rate. The IoT device 102 can transmit a service code that it has selected to the service enablement application 118. The service enablement application 118 can map this service code, based on the rules set 122 applicable to that IoT device 102 based on the identity of that IoT device 102, and select an eSIM profile 120 that can provide the QoS level to which the service code transmitted by the IoT device 102 matches. If the subject eSIM profile 120 is stored in the eUICC 108 of the IoT device 102, the service enablement application 118 may command the IoT device 102 to activate that eSIM profile 120. Alternatively, the service enablement application 118 may build a suitable eSIM profile 120, based on the QoS level that matches the service code sent by the IoT device 102, send the eSIM profile 120 it built to the IoT device 102, and command the IoT device 102 to store the eSIM profile 120 it built in the eUICC 108 and make the eSIM profile 120 it built active.

In an embodiment, the service enablement application 118 may be provided a travel itinerary of the IoT device 102, for example by the workstation 126 at the same time it provides the rule set 122. The service enablement application 118 may analyze the travel itinerary of the IoT device 102 and preload a plurality of suitable eSIM profiles 120 into the eUICC 108 of the IoT device 102. The preloading of eSIM profiles 120 by the service enablement application 118 to the eUICC 108 of the IoT device 102 can be done at a time when the IoT device 102 has network connectivity (cellular wireless coverage, WiFi wireless coverage, or other wireless coverage) available, thereby avoiding the eventuality that when the IoT device 102 might desirably be provided with a different eSIM profile 120 at its time of need it cannot be received due to a lack of wireless connectivity. The service enablement application 118 may still be able to push through a command to the IoT device 102 to switch to a different preloaded eSIM profile 120, although wireless connectivity is poor, because the eSIM switch command message may be relatively small in comparison to the size of the eSIM profile 120 itself. In an embodiment, the eSIM profile adapter 128 may itself select an eSIM profile 120 and activate it based on a service code it has generated. In support of this, the service enablement application 118 may associate a service code with each of the different eSIM profiles 120 that it preloads in the eUICC 108.

The service enablement application 118 may analyze the information received from the IoT device 102 about its communication environment in order to determine the contents of the eSIM profile 120 that will provide the QoS level designated by the service code sent by the IoT device 102. Providing the same QoS level in different communication environments may entail different eSIM profiles 120. This may be because the different MNOs have different communication services, different reliability levels, and/or different coverages.

The IoT device 102 may be addressed using a phone number or international mobile subscriber identity (IMSI). These numbers are a limited resource. The service enablement application 118 may maintain a plurality of wireless communication service subscription accounts with each of a plurality of MNOs. As one of the IoT devices 102 supported by the service enablement application 118 enters the service area of a first MNO, the service enablement application 118 may build a first eSIM profile comprising a first IMSI associated with the first MNO. The first IMSI may be one of 100 IMSIs associated with 100 different subscription accounts the service enablement application 118 maintains with the first MNO. The service enablement application 118 may send the first eSIM profile 120 comprising the first IMSI to the IoT device 102 and command it to store the first eSIM profile 120 in its eUICC 108 and to activate the first eSIM profile 120. Later, as the IoT device 102 is leaving the service area of the first MNO, the service enablement application 118 may build a second eSIM profile comprising a second IMSI associated with the second MNO. The second IMSI may be one of 87 IMSIs associated with 87 different subscription accounts the service enablement application 118 maintains with the second MNO. The service enablement application 118 may send the second eSIM profile 120 comprising the second IMSI to the IoT device 102 and command it to store the second eSIM profile 120 in its eUICC 108 and to activate the second eSIM profile 120. At the same time, the service enablement application 118 can recover and reuse the first IMSI associated with the first MNO for use with a different IoT device 102 that may be entering the service area of the first MNO.

The service enablement application 118 may maintain a set of aliases in the data store 124 that associates identities of IoT devices 102 to an IMSI currently associated to each of the IoT devices 102. Thus, when the eSIM profile 120 comprising the first IMSI is made active in the IoT device 102, the service enablement application 118 destroys an entry in the aliases 130 that associates the identity of the subject IoT device 102 with another IMSI and creates an entry associating the identity of the subject IoT device 102 with the first IMSI. Alternatively, the service enablement application 118 simply updates the previous entry for the identity of the IoT device 102 to associate that identity to the first IMSI. Later, when the same IoT device 102 is activated to the second eSIM profile 120 comprising the second IMSI, the service enablement application 118 may replace or update the entry in the aliases associated with the identity of the subject IoT device 102, to then associate the identity of the subject IoT device 102 to the second IMSI. Thus, to communicate with the IoT device 102, the service enablement application uses the unchanging identity of the IoT device 102 to look up the IMSI temporarily assigned to the IoT device 102, and then uses the IMSI to communicate with the IoT device 102. In an embodiment, the service enablement application 118 provides an API to the monitoring systems 115 to obtain the current IMSI of IoT devices 102 whereby the monitoring systems 115 are able to communicate with its IoT devices 102 as their IMSIs change over time.

Figure 3:
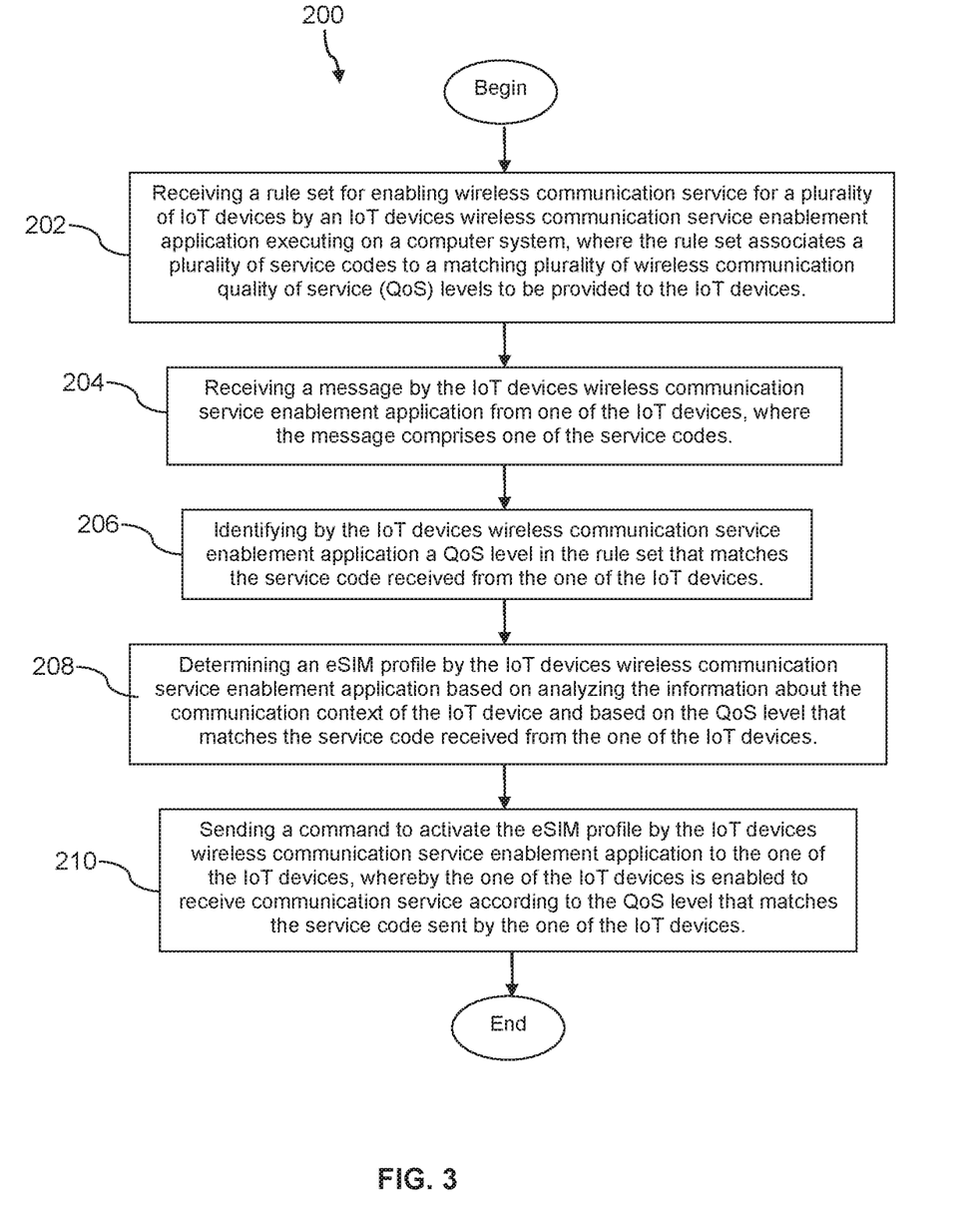
FIG. 3 is a flow chart of a method according to an embodiment of the disclosure.

Turning now to FIG. 3, a method 200 is described. In an embodiment, the method 200 is a method of enabling wireless communication service delivery to Internet of things (IoT) devices. At block 202, the method 200 comprises receiving a rule set for enabling wireless communication service for a plurality of IoT devices by an IoT devices wireless communication service enablement application executing on a computer system, where the rule set associates a plurality of service codes to a matching plurality of wireless communication quality of service (QoS) levels to be provided to the IoT devices.

At block 204, the method 200 comprises receiving a message by the IoT devices wireless communication service enablement application from one of the IoT devices, where the message comprises one of the service codes. At block 206, the method 200 comprises identifying by the IoT devices wireless communication service enablement application a QoS level in the rule set that matches the service code received from the one of the IoT devices.

At block 208, the method 200 comprises determining an eSIM profile by the IoT devices wireless communication service enablement application based on analyzing the information about the communication context of the IoT device and based on the QoS level that matches the service code received from the one of the IoT devices. At block 210, the method 200 comprises sending a command to activate the eSIM profile by the IoT devices wireless communication service enablement application to the one of the IoT devices, whereby the one of the IoT devices is enabled to receive communication service according to the QoS level that matches the service code sent by the one of the IoT devices.

Figure 4:
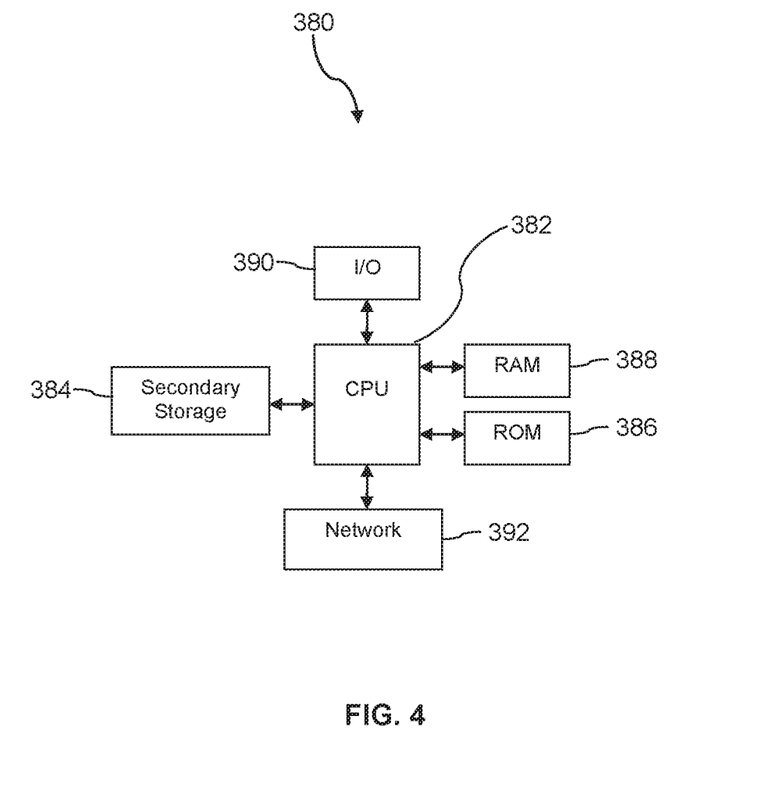
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An Internet of things (IoT) devices wireless communication service enablement platform, comprising:
   a non-transitory memory;
   a processor; and
   an IoT devices wireless communication service enablement application stored in the non-transitory memory that, when executed by the processor:
   receives a rule set for enabling wireless communication service for a plurality of IoT devices, where the rule set associates a plurality of service codes to a matching plurality of wireless communication qualify of service (QoS) levels to be provided to the IoT devices, and wherein the rule set comprises a list of identities of IoT devices that are associated with the rule set,
   receives a message from one of the IoT devices, where the message comprises information about a communication context of the IoT device,
   receives a message from the one of the IoT devices, where the message comprises one of the service codes,
   identifies a QoS level in the rule set that matches the service code received from the one of the IoT devices,
   determines an eSIM profile based on analyzing the information about the communication context of the IoT device and based on the QoS level that matches the service code received from the one of the IoT devices, and
   sends a command to activate the eSIM profile to the one of the IoT devices, whereby the one of the IoT devices is enabled to receive wireless communication service according to the QoS level that matches the service code sent by the one of the IoT devices.

2. The IoT devices wireless communication service enablement platform of claim 1, wherein the IoT devices wireless communication service enablement application:
   receives a rule set update message identifying at least one IoT device to add to the list of identities of ioT devices associated with the rule set, and
   adds the at least one IoT device to the list of identities of the IoT devices associated with the rule set.

3. The IoT devices wireless communication service enablement platform of claim 1, wherein the IoT devices wireless communication service enablement application further;
  receives a second rule set for enabling communication service for a second plurality of IoT devices, where the second rule set defines communication policies for the second plurality of IoT devices,
  determines a second eSIM profile based on analyzing information about the communication context of a second IoT device of the second plurality of IoT devices, and
  sends a command to activate the second eSIM profile to second IoT device of the second plurality of IoT devices, whereby the second IoT device is enabled to receive wireless communication service according to the communication policy defined in the second rule set.

4. The IoT devices wireless communication service enablement platform of claim 1, wherein the IoT devices wireless communication service enablement application further builds the eSIM profile determined based on analyzing the information about the communication context of the IoT device and sends the eSIM profile it builds to the one of the IoT devices.

5. The IoT devices wireless communication service enablement platform of claim 4, wherein the eSIM profile comprises an international mobile subscriber identity (IMSI) and the IoT devices wireless communication service enablement application further
  creates an association of an identity of the one of the IoT devices and the IMSI of the eSIM profile, and
  stores the association of the identity of the one of the IoT devices and the IMSI of the eSIM profile in a data store.

6. The IoT devices wireless communication service enablement platform of claim 1, wherein the eSIM profile comprises one or more artifacts selected from the list consisting of a network access credential, an international mobile subscriber identity (IMSI), an access point name (APN), a preferred roaming list (PRL), an application, and branding information.

7. A method of enabling wireless communication service delivery to Internet of things (IoT) devices, comprising:
  receiving a rule set for enabling wireless communication service for a plurality of IoT devices by an IoT devices wireless communication service enablement application executing on a computer system, where the rule set associates a plurality of service codes to a matching plurality of wireless communication quality of service (QoS) levels to be provided to the IoT devices, and wherein the QoS levels associate with minimum data throughput rates, maximum jitter, maximum latency, and service priority;
  receiving a message by the IoT devices wireless communication service enablement application from one of the IoT devices, where the message comprises one of the service codes;
  identifying by the IoT devices wireless communication service enablement application a QoS level in the rule set that matches the service code received from the one of the IoT devices;
  determining an eSIM profile by the IoT devices wireless communication service enablement application based on analyzing information about a communication context of the IoT device and based on the QoS level that matches the service code received from the one of the IoT devices; and
  sending a command to activate the eSIM profile by the IoT devices wireless communication service enablement application to the one of the IoT devices, whereby the one of the IoT devices is enabled to receive communication service according to the QoS level that matches the service code sent by the one of the IoT devices.

8. The method of claim 7, further comprising receiving a message by the IoT devices wireless communication service enablement application from the one of the IoT devices, where the message comprises the information about the communication context of the IoT device.

9. The method of claim 8, wherein the information about the communication context of the IoT device comprises information about a location of the IoT device and identities of MNO coverages detected.

10. The method of claim 8, wherein the information about the communication context of the IoT device comprises information about signal strength of MNO coverages detected or weather information.

11. The method of claim 7, wherein the QoS levels associate with a sleep mode, an awake mode, and a reporting interval.

12. The method of claim 7, wherein the eSIM profile enables the IoT device to wirelessly communicate according to one of a 5G, a long term evolution (LTE), a code division multiple access (CDMA), or a global system for mobile communications (GSM) telecommunication protocol.

13. An Internet of things (IoT) devices wireless communication service enablement platform, comprising:
  a non-transitory memory;
  a processor; and
  an IoT devices wireless communication service enablement application stored in the non-transitory memory that, when executed by the processor:
  receives a rule set for enabling communication service for a plurality of IoT devices, where the rule set associates a plurality of service codes to a matching plurality of wireless communication quality of service (QoS) levels to be provided to the IoT devices,
  receives a message from the one of the IoT devices, where the message comprises one of the service codes,
  identifies a QoS level in the rule set that matches the service code received from the one of the IoT devices,
  monitors the location of the one of the IoT devices,
  builds an eSIM profile based on the location of the one of the IoT devices and based on the QoS level that matches the service code received from the one of the IoT devices, wherein the eSIM profile built by the IoT devices wireless communication service application comprises an international mobile subscriber identity (IMSI) associated with a subscription account with a first MNO in a pool of IMSIs associated with subscription accounts with the first MNO maintained by an owner of the IoT devices wireless communication service enablement platform, and
  sends the eSIM profile to the one of the IoT devices.

14. The IoT devices wireless communication service enablement platform of claim 13, wherein the one of the IoT devices is associated with an appliance, a shipping container, or a vehicle.

15. The IoT devices wireless communication service enablement platform of claim 13, wherein the eSIM profile built by the IoT devices wireless communication service application comprises a network access credential, an international mobile subscriber identity (IMSI), an access point name (APN), and a preferred roaming list (PRL).

16. The IoT devices wireless communication service enablement platform of claim 13, wherein the eSIM profile enables the one of the IoT devices to wirelessly communicate according to a 5G, a long term evolution (LTE), a code division multiple access (CDMA), or a global system for mobile communication (GSM) telecommunication protocol.

17. The IoT devices wireless communication service enablement platform of claim 13, wherein the ioT devices wireless communication service application further:
  builds a second eSIM profile based on the QoS level that matches the service code received from the one of the IoT devices, where the second eSIM profile comprises a second IMSI associated with a subscription account with a second MNO in a pool of IMSIs associated with subscription accounts with the second MNO maintained by the owner of the IoT devices wireless communication service enablement platform, and
  sends the second eSIM profile to the one of the IoT devices, whereby the one of the IoT devices is enabled to wirelessly communicate via the second MNO.

\* \* \* \* \*